(12) United States Patent
Kashiwagi et al.

(10) Patent No.: US 10,338,289 B2
(45) Date of Patent: Jul. 2, 2019

(54) OPTICAL MEMBER AND IMAGE DISPLAY DEVICE INCLUDING OPTICAL MEMBER

(71) Applicant: FUJIFILM Corporation, Tokyo (JP)

(72) Inventors: Daisuke Kashiwagi, Kanagawa (JP); Yoji Ito, Kanagawa (JP); Michio Nagai, Kanagawa (JP); Akira Yamamoto, Kanagawa (JP); Nobuhiko Ichihara, Kanagawa (JP); Hideyuki Nakamura, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 72 days.

(21) Appl. No.: 15/616,398

(22) Filed: Jun. 7, 2017

(65) Prior Publication Data

US 2017/0269272 A1 Sep. 21, 2017

Related U.S. Application Data

(63) Continuation of application No. PCT/JP2015/084588, filed on Dec. 10, 2015.

(30) Foreign Application Priority Data

Dec. 11, 2014 (JP) .................. 2014-251211

(51) Int. Cl.
*G02F 1/1335* (2006.01)
*G02B 5/30* (2006.01)
(Continued)

(52) U.S. Cl.
CPC ......... *G02B 5/3016* (2013.01); *G06F 3/0321* (2013.01); *G06F 3/03545* (2013.01); *G06F 3/0421* (2013.01)

(58) Field of Classification Search
CPC ............... G02B 5/3016; G02B 3/0321; G02B 3/03545; G02B 3/0421
See application file for complete search history.

(56) References Cited

U.S. PATENT DOCUMENTS 8,993,100 B2 3/2015 Sekine et al.
2007/0128000 A1 6/2007 Huang et al.
(Continued)

FOREIGN PATENT DOCUMENTS

JP 2007-072419 A 3/2007
JP 2008-026958 A 2/2008
(Continued)

OTHER PUBLICATIONS

International Preliminary Report on Patentability issued by WIPO dated Jun. 15, 2017, in connection with international Patent Application No. PCT/JP2015/084588.
(Continued)

*Primary Examiner* — James A Dudek
(74) *Attorney, Agent, or Firm* — Edwards Neils, LLC; Jean C. Edwards, Esq.

(57) ABSTRACT

Provided is an optical member including: a substrate; and a dot that is in contact with a surface of the substrate, in which the dot is formed of a liquid crystal material having a cholesteric structure, four or more dots form one recognition effective region as an aggregate, and a shortest inter-end distance between one arbitrary dot and at least two other dots in the recognition effective region is 10 μm or less. in the optical member, even when a dot pattern is observed in an oblique direction, retroreflection properties are exhibited and the intensity of reflected light is high. By using the optical member according to the present invention, an image display device having a high data input sensitivity can be provided.

14 Claims, 1 Drawing Sheet

(51) Int. Cl.
G06F 3/0354 (2013.01)
G06F 3/042 (2006.01)
G06F 3/03 (2006.01)

(56) References Cited

U.S. PATENT DOCUMENTS

| | | |
|---|---|---|
| 2008/0182041 A1 | 7/2008 | Sekine et al. |
| 2008/0233360 A1* | 9/2008 | Sekine ................ B32B 38/145 |
| | | 428/195.1 |
| 2011/0177303 A1* | 7/2011 | Suehiro .................... B44C 3/02 |
| | | 428/195.1 |

FOREIGN PATENT DOCUMENTS

| | | |
|---|---|---|
| JP | 2008-165385 A | 7/2008 |
| JP | 2008-180798 A | 8/2008 |
| JP | 2008-269545 A | 11/2008 |
| JP | 2009-139465 A | 6/2009 |
| JP | 2011-132349 A | 7/2011 |
| JP | 2013-061955 A | 4/2013 |

OTHER PUBLICATIONS

International Search Report issued in connection with International Patent Application No. PCT/JP2015/084588 dated Mar. 15, 2016.
International Preliminary Report on Patentability of Chapter II issued in connection with International Patent Application No. PCT/JP2015/084588 dated Dec. 27, 2016.
Notification of Reasons for Refusal issued by the Japanese Patent Office (JPO) dated Nov. 28, 2017, in connection with Japanese Patent Application No. 2014-251211.

* cited by examiner

OPTICAL MEMBER AND IMAGE DISPLAY DEVICE INCLUDING OPTICAL MEMBER

CROSS-REFERENCE TO RELATED APPLICATIONS

This application is a continuation of PCT International Application No. PCT/JP2015/084588 filed on Dec. 10, 2015, which was published under PCT Article 21(2) in Japanese, and which claims priority under 35 U.S.C § 119 (a) to Japanese Patent Application No. 2014-251211 filed on Dec. 11, 2014. The above applications are hereby expressly incorporated by reference, in their entirety, into the present application.

BACKGROUND OF THE INVENTION

1. Field of the Invention

The present invention relates to an optical member and an image display device including the optical member.

2. Description of the Related Art

Recently, the necessity of a system in which data is handwritten on a display device using an electronic pen or the like to input data has increased. JP2008-165385A discloses a transparent sheet in which a dot pattern formed of a transparent ink is printed on a transparent substrate, in which the transparent ink includes a liquid crystal material having a cholesteric structure which selectively reflects infrared light. This transparent sheet can be used in the above-described system when mounted in a display device and used in combination with an electronic pen, the electronic pen including: an infrared sensor that detects reflected light from the dot pattern; and an infrared irradiating portion.

SUMMARY OF THE INVENTION

The liquid crystal material having a cholesteric structure has wavelength selective reflecting properties which are the highest in a helical axis direction of the cholesteric structure. For example, in a case where the transparent sheet is formed in a plane shape, the maximum reflecting properties at a desired wavelength are exhibited in a normal direction perpendicular to the plane. Therefore, in a case where reflected light is read in an oblique direction using the electronic pen or the like in the system, the intensity of the reflected light is not strong, and it is difficult to obtain a high sensitivity, JP2008-165385A describes that, by distributing a tilt angle between a helical axis direction and a normal line perpendicular to a surface of the transparent substrate at least in a range of 0° to 45°, an infrared reflection pattern-printed transparent sheet having a wide reading angle can be formed. However, the structure where the tilt angle is distributed as described above is adopted only to diffuse light, and the detection sensitivity in respective directions cannot be sufficiently increased.

An object of the present invention is to provide an optical member including a dot pattern which is formed of a liquid crystal material having a cholesteric structure, in which the detection sensitivity of the dot pattern in various directions including an oblique direction is high. That is, an object of the present invention is to provide an optical member including a liquid crystal material having a cholesteric structure, in which, even when the dot pattern is observed in an oblique direction, retroreflection properties are exhibited and the intensity of reflected light is high. Another object of the present invention is to provide an image display device which is capable of inputting data and has a high data input sensitivity.

The present inventors repeated an investigation on a reflection member including a liquid crystal material having a cholesteric structure, and conceived a new design as "recognition effective region" corresponding to "dot" in the related art. As a result of further investigation, the present inventors found that the detection sensitivity can be effectively increased due to the above-described design, thereby completing the present invention.

That is, the present invention provides the following [1] to [15].

[1] An optical member comprising:
a substrate; and
a dot that is in contact with a surface of the substrate,
in which the dot is formed of a liquid crystal material having a cholesteric structure,
four or more dots form one recognition effective region as an aggregate, and
a shortest inter-end distance between one arbitrary dot and at least two other dots in the recognition effective region is 10 μm or less.

[2] The optical member according to [1],
in which each of the dots has a diameter of 20 to 50 μm.

[3] The optical member according to [1],
in which each of the dots has a diameter of 20 to 45 μm.

[4] The optical member according to [1],
in which each of the dots has a diameter of 20 to 40 μm.

[5] The optical member according to any one of [1] to [4],
in which when the recognition effective region is formed of a smallest circle including the four or more dots, a radius of the circle is 125 μm.

[6] The optical member according to any one of [1] to [5],
in which the liquid crystal material includes a surfactant.

[7] The optical member according to [6],
in which the surfactant is a fluorine surfactant.

[8] The optical member according to any one of [1] to [7],
in which a value obtained by dividing a maximum height of each of the dots by the diameter of the dot is 0.13 to 0.30.

[9] The optical member according to any one of [1] to [8],
in which in an end portion of each of the dots, an angle between the surface of the dot and the substrate is 27° to 62°.

[10] The optical member according to any one of [1] to [9],
in which the liquid crystal material is a material obtained by curing a liquid crystal composition including a liquid crystal compound and a chiral agent.

[11] The optical member according to any one of [1] to [10],
in which a plurality of recognition effective regions are provided in a pattern shape on the surface of the substrate.

[12] The optical member according to any one of [1] to [11],
in which each of the dots has wavelength selective reflecting properties in which a center wavelength is present in an infrared range.

[13] The optical member according to claim [12],
in which each of the dots has wavelength selective reflecting properties in which a center wavelength is present at a wavelength of 800 to 950 nm.

[14] The optical member according to any one of [1] to [13] which is transparent.

[15] An image display device comprising the optical member according to [14].

According to the present invention, a new optical member is provided. For example, the optical member according to the present invention is attached to an image display device such that it can be used for directly handwriting data on the image display device using an electronic pen or the like to input data. By using the optical member according to the present invention, even in a case where an operation using an electronic pen or the like is performed in an oblique direction, data can be input with a high sensitivity.

DESCRIPTION OF THE PREFERRED EMBODIMENTS

Figure 1:
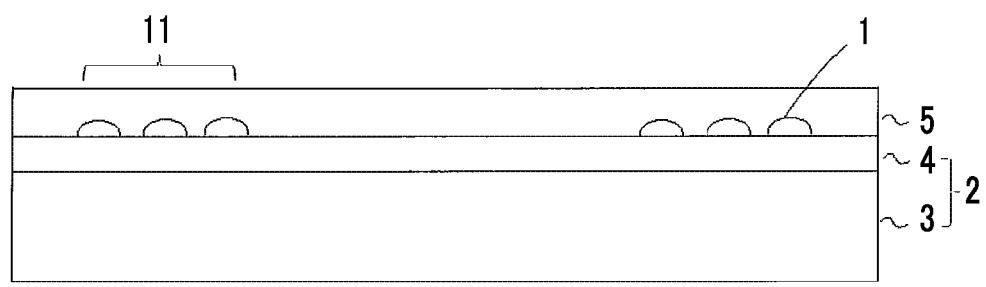
FIG. 1 is a cross-sectional view schematically showing an example of an optical member according to the present invention.

Hereinafter, the present invention will be described in detail.

In this specification, numerical ranges represented by "to" include numerical values before and after "to" as lower limit values and upper limit values. In this specification, for example, unless specified otherwise, an angle such as "45°", "parallel", "perpendicular", or "orthogonal" represents that a difference from an exact angle is less than 5 degrees. The difference from an exact angle is preferably less than 4 degrees and more preferably less than 3 degrees.

In this specification, "(meth)acrylate" represents "either or both of acrylate and methacrylate".

In this specification, numerical values, numerical ranges, and qualitative expressions (for example, the expression "the same") implies numerical values, numerical ranges, and properties including errors which are generally allowable in the technical field. In particular, in this specification, the meaning of "all", "entire", or "entire surface" includes not only 100% but also a case where an error range is generally allowable in the technical field, for example, 99% or more, 95% or more, or 90% or more.

Visible light refers to light which can be observed by human eyes among electromagnetic waves and refers to light in a wavelength range of 380 nm to 780 nm. Invisible light refers to light in a wavelength range of shorter than 380 nm or longer than 780 nm.

Among infrared light rays, near infrared light refers to an electromagnetic wave in a wavelength range of 780 nm to 2500 nm. Ultraviolet light refers to light in a wavelength range of 10 to 380 nm.

In this specification, retroreflection refers to reflection in which incident light is reflected in an incidence direction.

In this specification, "polar angle" refers to an angle with respect to a normal line perpendicular to a substrate.

In this specification, a surface of a dot refers to a surface or an interface of the dot opposite to a substrate, which is a surface in contact with the substrate. An end portion of a dot does not interfere with contact between a surface of a dot and the substrate.

"Transparent" described in this specification represents that the light transmittance is preferably 50% or higher, more preferably 70% or higher, and still more preferably 85% or higher.

The light transmittance refers to a visible transmittance obtained using a method described in JIS A5759. That is, the visible transmittance is obtained by measuring a transmittance at a wavelength of 380 nm to 780 nm using a spectrophotometer and multiplying the measured transmittance by a weigthing factor to obtain a weighted average, the weigthing factor being obtained based on a spectral distribution of daylight D65 defined by The International Commission on Illumination (CIE) and a wavelength distribution and a wavelength interval of spectral luminous efficiency function for photopic vision defined by CIE.

In this specification, "haze" refers to a value measured using a haze meter NDH-2000 (manufactured by Nippon Denshoku industries Co., Ltd.).

Theoretically, haze refers to a value expressed by the following expression.

$$\text{(Diffuse Transmittance of Natural Light at 380 to 780 nm)}/\text{(Diffuse Transmittance of Natural Light at 380 to 780 nm} + \text{Parallel Transmittance of Natural Light)} \times 100\%$$

The diffuse transmittance refers to a value calculated by subtracting the parallel transmittance from a total transmittance which is obtained using a spectrophotometer and an integrating sphere unit. The parallel transmittance refers to a transmittance at 0° in a case where a value measured using an integrating sphere unit is used.

<Optical Member>

The optical member includes: a substrate; and a dot that is formed on a surface of the substrate, that is, a dot that is in contact with the surface of the substrate. The dot that is in contact with the surface of the substrate refers to a dot that is in direct contact with the surface of the substrate.

The shape of the optical member is not particularly limited and is, for example, a film shape, a sheet shape, or a plate shape.

FIG. 1 is a cross-sectional view schematically showing an example of the optical member according to the present invention. In this example, dots 1 are in contact with an underlayer-side surface of a substrate 2 including a support 3 and an underlayer 4. Four or more dots 1 (in the drawing, only three dots) form a recognition effective region 11 as an aggregate. An overcoat layer 5 is provided on the dot-formed surface side of the substrate so as to cover the dots 1.

The optical member according to the present invention may be transparent or not in the visible range depending on the application and is preferably transparent.

In the optical member according to the present invention, the upper limit of the haze is preferably 5% or lower, more preferably 3% or lower, and still more preferably 2% or lower.

<Substrate>

The substrate included in the optical member according to the present invention functions as a substrate for forming the dot on the surface of the underlayer.

It is preferable that the reflectance of the substrate is low at a wavelength where the dot reflects light, and it is preferable that the substrate does not include a material which reflects light at a wavelength where the dot reflects light.

In addition, it is preferable that the substrate is transparent in the visible range. In addition, the substrate may be colored. However, it is preferable that the substrate is not colored or the area of the substrate colored is small. Further, the refractive index of the substrate is preferably about 1.2 to 2.0 and more preferably about 1.4 to 1.8. The above-described configurations are made in order to prevent deterioration in the visibility of an image displayed on a display in a case where the optical member is used for, for example, a front surface of the display.

The thickness of the substrate may be selected depending on the application without any particular limitation, and is preferably about 5 μm to 1000 μm, more preferably 10 μm to 250 μm, and still more preferably 15 μm to 150 μm.

The substrate may have a single-layer structure or a multi-layer structure. In a case where the substrate has a single-layer structure, examples thereof include glass, triacetyl cellulose (TAC), polyethylene terephthalate (PET), polycarbonates, polyvinyl chloride, acryl, and polyolefin. In a case where the substrate has a multi-layer structure, examples thereof a substrate including: one of the examples of the substrate having a single-layer structure that is provided as a support; and another layer that is provided on a surface of the support.

Examples of the other layer include an underlayer that is provided between the support and the dot. The underlayer is preferably a resin layer and more preferably a transparent resin layer. Examples of the underlayer include a layer for adjusting the surface shape during the formation of a dot, a layer for improving adhesion properties with a dot, and an alignment layer for adjusting the orientation of a polymerizable liquid crystal compound during the formation of a dot. It is preferable that the reflectance of the underlayer is low at a wavelength where the dot reflects light, and it is preferable that the underlayer does not include a material which reflects light at a wavelength where the dot reflects light. In addition, it is preferable that the underlayer is transparent. Further, the refractive index of the underlayer is preferably about 1.2 to 2.0 and more preferably about 1.4 to 1.8. It is preferable that the underlayer is a thermosetting resin or a photocurable resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 μm and more preferably 0.05 to 20 μm.

The surface of the substrate or the underlayer may be treated before the formation of the dot. For example, in order to form a dot having a desired shape or to form a desired dot pattern, a hydrophilic treatment or a treatment for forming an uneven shape may be performed on the surface of the substrate.

<Recognition Effective Region>

In the optical member according to the present invention, four or more dots are formed as an aggregate. The dots which form the aggregate are not particularly limited as long as they are formed on the surface of the substrate to be adjacent to each other and optical characteristics of the dots such as selective reflecting properties only has to be substantially the same as optical characteristics of the entire aggregate. In this specification, as described above, the recognition effective region refers to a region where the dots are recognized to have the same optical characteristics as a whole aggregate. In the optical member according to the present invention, the recognition effective region which is formed of four or more dots and reflects light is provided. As a result, light reflection from an inclined portion or a curved portion of each of the dots can be efficiently obtained over the entire region of the recognition effective region, and the sensitivity can be increased when the dots are observed in an oblique direction for use in a data input system.

In the optical member according to the present invention, one arbitrary dot in the recognition effective region is adjacent to at least two other dots in the recognition effective region by a distance of 10 μm or less. At this time, the distance refers to the distance between end portions most adjacent to each other. In a case where the distance between end portions most adjacent to each other is more than 10 μm, the dots are not likely to he recognized to have the same optical characteristics as a whole aggregate. The inter-end distance is preferably 9 μm or less, 8 μm or less, 7 μm or less, or 6 μm or less. From the viewpoint of shape retention depending on a jetting accuracy, the inter-end distance is preferably 2 μm or more, more preferably 3 μm or more, still more preferably 4 μm or more, and even still more preferably 5 μm or more. It is preferable that the dots are disposed in the recognition effective region such that one arbitrary dot in the recognition effective region is adjacent to as many other dots as by the above-described inter-end distance.

The number of dots in one recognition effective region is 4 or more. In a case where the number of dots is less than 4, it is difficult to obtain the effect of improving the sensitivity. The number of dots may be 4 to 30 and is preferably 4 to 20. Specifically, the number of dots may be, for example, 4, 7, 9, or 16. It is also preferable that the number of dots is a number (for example, 7 or 19) in which one arbitrary dot in the recognition effective region can be adjacent to at least three other dots in the recognition effective region by the above-described distance of 10 μm or less.

It is preferable that, when the recognition effective region is formed of a smallest circle including the four or more dots, a radius of the circle is 125 μm. Further, the radius of the circle may be 115 μm or less, 100 μm or less, or 90 μm or less. In addition, the radius of the circle is preferably 32 μm or more and more preferably 50 μm or more.

In the optical member according to the present invention, a plurality of recognition effective regions may be formed in a pattern shape. Further, the plurality of recognition effective regions which are formed in a pattern shape may have a function of presenting information. For example, by forming the recognition effective regions in a pattern shape so as to provide position information on an optical member which is formed in a sheet shape, the optical member can be can be used as a sheet which can be mounted on a display and is capable of inputting data.

Regarding the distance between the plurality of recognition effective regions, when each of the recognition effective regions is formed of a smallest circle including the four or more dots, the distance between centers is, for example, preferably 100 to 1000 μm, more preferably 200 to 500 μm, and still more preferably 250 to 400 μm.

A ratio of a dot diameter to the distance between the plurality of recognition effective regions may be 1:5 to 1:50 and is preferably 1:10 to 1:40 and more preferably 1:15 to 1:35.

For example, the number of recognition effective regions per unit 2 mm×2 mm area of the substrate surface is 10 to 100 on average and is preferably 15 to 50 and more preferably 20 to 40.

In a case where a plurality of recognition effective regions are provided on a surface of the substrate, the radii, the numbers of dots, and the dot disposition configurations of the recognition effective regions may be the same as or different from each other and are preferably the same as each other in order to obtain uniform reflected light from the respective recognition effective regions.

<Dot>

The optical member according to the present invention includes a dot that is in contact with a surface of the substrate. The dots may be formed on a single surface or both surfaces of the substrate and is preferably formed on a single surface thereof.

In a case where a plurality of dots are provided on a surface of the substrate, the diameters and shapes of the dots may be the same as or different from each other and is preferably the same as each other. For example, it is preferable that the dots are formed under the same conditions for forming the dots having the same diameter and shape.

In this specification, the description of the dot is applicable to all the dots in the optical member according to the present invention. Further, it is allowable that the optical member according to the present invention including the above-described dots also includes a dot which deviates from the above description due to an error which is allowable in the technical field.

(Shape of Dot)

The shape of the dot is not particularly limited and is preferably circular when observed from a normal direction perpendicular to the substrate. The circular shape is not necessarily a perfect circle and may be a substantially circular shape. The center of the dot described herein refers to the center of the circle or the center of gravity.

The diameter of the dot (which may be a dot diameter when the dot is approximated to a circle) is preferably 50 μm or less, more preferably 45 μm or less, and still more preferably 40 μm or less. In addition, the diameter of the dot is more preferably 20 μm or more. In the optical member according to the present invention, the recognition effective region formed of four or more dots is provided. As a result, even in a case where the diameter of each of the dots is small, a pattern having a high sensitivity can be formed in the optical member. In a case where the diameter of the dot is 50 μm or less, it is difficult to visually recognize the shape of the dot. Therefore, for example, in a case where the optical member is used in a state where it is mounted on a front surface of a display of an image display device, there is little effect on the display screen.

The diameter of the dot can be obtained by measuring the length of a line, which ranges from an end portion (an edge or a boundary of the dot) to another end portion and passes through the center of the dot, in an image obtained using a microscope such as a laser microscope, a scanning electron microscope (SEM), or a transmission electron microscope (TEM). The number of dots and the distance between dots can be obtained from a microscopic image obtained using a laser microscope, a scanning electron microscope (SEM), or a transmission electron microscope (TEM)

It is preferable that the dot includes a portion having a height which continuously increases to a maximum height in a direction moving from an end portion of the dot to the center of the dot. In this specification, the above portion will also be referred to as the inclined portion or the curved portion. That is, it is preferable that the dot includes an inclined portion, a curved portion, or the like whose height increases from an end portion of the dot to the center of the dot.

"The height" of the dot described in this specification refers to "the shortest distance from a point of a surface of the dot to a surface of the substrate where the dot is formed". In addition, in a case where the substrate has convex and concave portions, a surface of an end portion of the dot extending from the substrate is set as the surface where the dot is formed. The maximum height refers to a maximum value of the height which is, for example, the shortest distance from the peak of the dot to the surface of the substrate where the dot is formed. The height of the dot can be obtained from a cross-sectional view of the dot which is obtained by focal position scanning using a laser microscope or obtained using a microscope such as a SEM or a TEM.

Examples of a shape of a structure including the inclined portion or the curved portion include a hemispherical shape in which the substrate side is planar, a shape (spherical segment shape) in which the top of the hemispherical shape is cut and smoothened to be substantially parallel to the substrate, a conical shape having a bottom on the substrate side, a shape (truncated conical shape) in which the top of the conical shape is cut and smoothened to be substantially parallel to the substrate, and a shape which can be approximated to one of the above shapes. Among these shapes, a hemispherical shape in which the substrate side is planar, a shape in which the top of the hemispherical shape is cut and smoothened to be substantially parallel to the substrate, a shape in which the top of a conical shape having a bottom on the substrate side is cut and smoothened to be substantially parallel to the substrate, or a shape which can be approximated to one of the above shapes is preferable. The hemispherical shape represents not only a hemispherical shape in which a surface including the center of a sphere is planar but also any one of spherical segment shapes obtained by cutting a sphere into two segments at an arbitrary position.

A point of the dot surface for obtaining the maximum height of the dot may be present at the peak of a hemispherical shape or a conical shape or may be present on a surface which is cut and smoothened to be substantially parallel to the substrate. It is preferable that the maximum height of the dot is obtained at all the points of the smooth surface. It is also preferable that the maximum height is obtained at the center of the dot.

It is preferable that a value (maximum height/diameter) obtained by dividing the maximum height by the diameter of the dot is 0.13 to 0.30. It is preferable that the above-described condition is satisfied particularly in a shape in which the height of the dot continuously increases to the maximum height from an end portion of the dot and in which the maximum height is obtained at the center of the dot, for example, a hemispherical shape in which the substrate side is planar, a shape in which the top of the hemispherical shape is cut and flattened to be substantially parallel to the substrate, or a shape in which the top of a conical shape having a bottom on the substrate side is cut and flattened to be substantially parallel to the substrate. The ratio maximum height/diameter is more preferably 0.16 to 0.28.

In the optical member according to the present invention, the size of each of the dots can be reduced. Therefore, the height required for an identification region can be reduced, and the thickness of the optical member can be reduced.

In addition, an angle (for example, an average value) between a surface of the dot and the substrate (surface of the substrate where the dot is formed) is preferably 27° to 62° and more preferably 29° to 60°. By setting the angle in the above-described range, the dot can be made to exhibit high retroreflection properties at a light incidence angle which is suitable for the applications of the optical member described below.

The angle can be obtained from a cross-sectional view of the dot which is obtained by focal position scanning using a laser microscope or obtained using a microscope such as a SEM or a TEM. In this specification, in a SEM image of a cross-sectional view of a surface of the dot perpendicular to the substrate including to the center of the dot, the angle of a contact portion between the substrate and the dot surface is measured.

[Optical Characteristics of Dot]

The dot has wavelength selective reflecting properties. Light where the dot exhibits selective reflecting properties is not particularly limited. For example, any one of infrared light, visible light, and ultraviolet light may be used. For example, in a case where the optical member is attached to a display device and is used for directly handwriting data on the display device to input data, the wavelength of light to which the dot exhibits selective reflecting properties is preferably a wavelength in the invisible range, more preferably a wavelength in the infrared range, and still more preferably a wavelength in the near infrared range in order not to adversely affect a display image. For example, it is preferable that a spectrum of reflection from the dot shows a reflection wavelength range in which a center wavelength is present in a wavelength range of 750 to 2000 nm and preferably 800 to 1500 nm. It is also preferable that the reflection wavelength is selected based on a wavelength of light emitted from a light source which is used in combination or a wavelength of light which is detected by a image pickup element (sensor).

It is preferable that the dot is transparent in the visible range. In addition, the dot may be colored. However, it is preferable that the dot is not colored or the area of the dot colored is small. The above-described configurations are made in order to prevent deterioration in the visibility of an image displayed on a display of an image display device in a case where the optical member is used for, for example, a front surface of the display.

[Cholesteric Structure]

The dot is formed of a liquid crystal material having a cholesteric structure

It is known that the cholesteric structure exhibits selective reflecting properties at a specific wavelength. A center wavelength (reflection peak wavelength) $\lambda$ of the selective reflection depends on a pitch P (=helical cycle) of a helical structure in the cholesteric structure and complies with an average refractive index n of a cholesteric liquid crystal and a relationship of $\lambda = n \times P$. Therefore, the selective reflection wavelength can be adjusted by adjusting the pitch of the helical structure. The pitch of the cholesteric structure depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent.

The details of the adjustment of the pitch can be found in "Fuji Film Research & Development" No. 50 (2005), pp. 60 to 63. As a method of measuring a helical twisting direction or a pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric structure is observed as a stripe pattern including bright portions and dark portions when observed with a scanning electron microscope (SEM). Two cycles of the bright portion and the dark portion (two bright portions and two dark portions) correspond to one helical pitch. Therefore, the pitch can be measured from the SEM cross-sectional view. A normal line perpendicular to each line of the stripe pattern is a helical axis direction.

Selectively reflected light of the cholesteric structure has circularly polarized light selectivity. Whether or not the reflected light of the cholesteric structure is right circularly polarized light or left circularly polarized light is determined depending on a helical twisting direction. Regarding the selective reflection by the cholesteric liquid crystals, in a case where the helical twisting direction of the cholesteric liquid crystals is right, right circularly polarized light is reflected, and in a case where the helical twisting direction of the cholesteric liquid crystals is left, left circularly polarized light is reflected.

A full width at half maximum $\Delta\lambda$ (nm) of a selective reflection bandwidth (circularly polarized light reflection bandwidth) depends on a birefringence $\Delta n$ of the liquid crystal compound and the pitch P and complies with a relationship of $\Delta\lambda = \Delta n \times P$. Therefore, the selective reflection bandwidth can be controlled by adjusting $\Delta n$. $\Delta n$ can be adjusted by adjusting the kind of the polymerizable liquid crystal compound and a mixing ratio thereof, or by controlling a temperature during oriented immobilization. The full width at half maximum of the reflection wavelength range is adjusted depending on the application of the optical member according to the present invention and is, for example, 50 to 500 nm and preferably 100 to 300 nm.

[Cholesteric Structure in Dot]

It is preferable that, in the dot, an angle between a helical axis of the cholesteric structure and a surface of the dot is in a range of 50° to 90°. The angle is more preferably in a range of 60° to 90° and still more preferably in a range of 70° to 90°. It is more preferable that, on a surface of the dot, an angle between a helical axis of the cholesteric structure and the surface of the dot is in a range of 70° to 90°.

The helical axis of the cholesteric structure is present in a normal direction perpendicular to a line formed using each dark portion when a cross-section of the dot is observed with a scanning electron microscope (SEM). An angle between the helical axis of the cholesteric structure and a surface of the dot refers to an angle between it is preferable that an angle between a normal line perpendicular to a line, which is formed using a first dark portion from the surface of the dot, and the surface of the dot. When the surface is curved, an angle between the normal line and a tangent line of the surface in the cross-section may be obtained. In particular, by satisfying the angle in the inclined portion or the curved portion, the dot can also exhibit high retroreflection properties with respect to light incident from various directions with an angle from the normal direction perpendicular to the substrate. For example, depending on the shape of the dot, the dot can exhibit high retroreflection properties with respect to light incident from a direction with a polar angle of 27° and preferably with respect to light incident from a direction with a polar angle of 45°.

The cholesteric structure can be obtained by immobilizing a cholesteric liquid crystal phase. The structure in which a cholesteric liquid crystal phase is immobilized may be a structure in which the orientation of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is oriented, polymerizing and curing the polymerizable liquid crystal compound with ultraviolet irradiation, heating, or the like to form a layer having no fluidity, and concurrently changing the state of the polymerizable liquid crystal compound into a state where the oriented state is not changed by an external field or an external force. The structure in which a cholesteric liquid crystal phase is immobilized is not particularly limited as long as the optical characteristics of the cholesteric liquid crystal phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

[Liquid Crystal Composition]

Examples of a material used for forming the cholesteric structure include a liquid crystal composition including a liquid crystal compound and a chiral agent. It is preferable that the liquid crystal compound is a polymerizable liquid crystal compound.

The liquid crystal composition including a polymerizable liquid crystal compound may further include, for example, a surfactant or a polymerization initiator.

(Polymerizable Liquid Crystal Compound)

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming a cholesteric liquid crystal layer include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770, 107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), JP2001-328973A, JP2014-198815A, and JP2014-198814A. Two or more polymerizable liquid crystal compounds may be used in combination. In a case where two or more polymerizable liquid crystal compounds are used in combination, the orientation temperature can be decreased.

Specific examples of the polymerizable liquid crystal compound include a compound represented by any one of the following formulae (1) to (11).

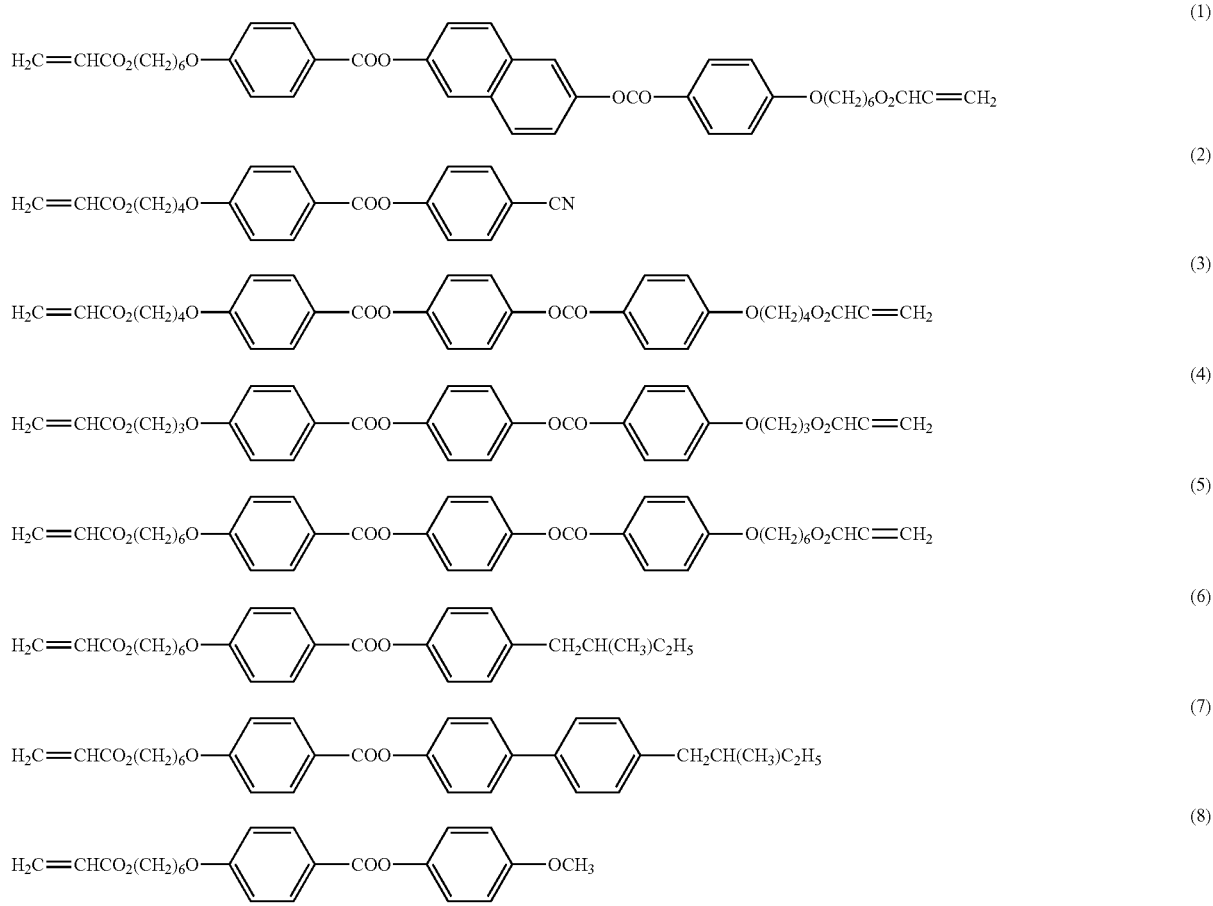

-continued

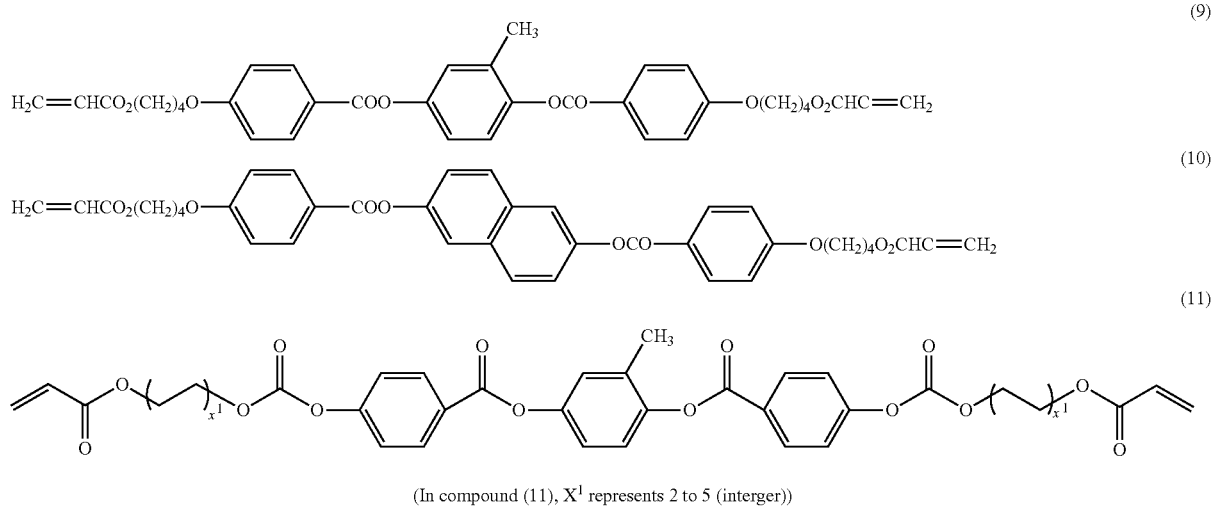

(In compound (11), $X^1$ represents 2 to 5 (interger))

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in 21997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

(Chiral Agent (Optically Active Compound))

The chiral agent has a function of causing a helical structure of a cholesteric liquid crystal phase to be formed. The chiral compound may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for TN or STN, p. 199), isosorbide, or an isomannide derivative can be used.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this configuration, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

Specific examples of the chiral agent include a compound represented by the following Formula (12).

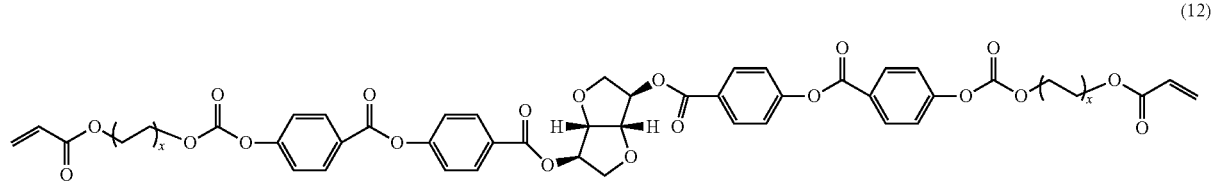

In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

(Surfactant)

The liquid crystal composition may include a surfactant. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate described in paragraphs "0018" to "0043" of JP2007-272185A.

As the surfactant, one kind may be used alone, or two or more kinds may be used in combination.

Examples of the fluorine surfactant include a compound represented by Formula (I) described in paragraphs "0082" to "0090" of JP2014-119605A.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

(Polymerization Initiator)

In a case where the liquid crystal composition includes a polymerizable compound, it is preferable that the liquid crystal composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an. acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A), The content of the photopolymerization initiator in the liquid crystal composition is preferably 0.1 to 20 mass % and more preferably 0.5 mass % to 12 mass % with respect to the content of the polymerizable liquid crystal compound.

(Crosslinking Agent)

In order to improve the film hardness after curing and to improve durability, the liquid crystal composition may arbitrarily include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these curing agents, one kind may be used alone, or two or more kinds may be used in combination.

The content of the crosslinking agent is preferably 3 mass % to 20 mass % and more preferably 5 mass % to 15 mass %. In a case where the content of the crosslinking agent is lower than 3 mass %, an effect of improving the crosslinking density may not be obtained. In a case where the content of the crosslinking agent is higher than 20 mass %, the stability of a cholesteric liquid crystal layer may deteriorate.

(Other Additives)

In a case where an ink jet method described below is used as a method of forming the dot, a monofunctional polymerizable monomer may be used in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, a ultraviolet absorber, a light stabilizer, a colorant, metal oxide particles or the like can be added to the liquid crystal composition in a range where optical performance and the like do not deteriorate.

(Solvent)

It is preferable that the liquid crystal composition is used as a liquid during the formation of the dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these curing agents, one kind may be used alone, or two or more kinds may be used in combination. Among these, a ketone is more preferable in consideration of an environmental burden. The above-described component such as the above-described monofunctional polymerizable monomer may function as the solvent.

[Method of Forming Dot]

A dot can be formed on a surface of the substrate by applying the liquid crystal composition to the substrate, drying the liquid crystal composition, and optionally curing the liquid crystal composition.

The application of the liquid crystal composition to the substrate is preferably performed by jetting. In a case where a plurality of dots are formed on the substrate, the liquid crystal composition may be printed as an ink. A printing method is not particularly limited and, for example, an ink jet method, a gravure printing method, or a flexographic printing method can be used. Among these, an ink jet method is preferable. The pattern of the dots can also be formed using a well-known printing technique.

(Drying of Liquid Crystal Composition)

The liquid crystal composition applied to the surface of the substrate is optionally dried. The liquid crystal composition may be heated for drying or may be dried and then heated. In a drying or heating step, the liquid crystal compound in the liquid crystal composition only has to be oriented to form a cholesteric liquid crystal phase. In the case of heating, the heating temperature is preferably 200° C. or lower and more preferably 130° C. or lower.

(Curing of Liquid Crystal Composition)

In a case where the liquid crystal composition is a polymerizable liquid crystal compound, the oriented polymerizable liquid crystal compound may be polymerized by curing the liquid crystal composition. The liquid crystal composition may be cured by light irradiation or heating and preferably by light irradiation. Regarding the light irradiation, ultraviolet light is preferably used. The irradiation energy is preferably 20 mJ/cm$^2$ to 50 mJ/cm$^2$ and more preferably 100 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher. The polymerization degree can be determined by obtaining a consumption ratio between polymerizable functional groups using an IR absorption spectrum.

<Overcoat Layer>

The optical member may include an overcoat layer. The overcoat layer may be provided on a surface of the substrate where the dot is formed, that is, a surface of the substrate in contact with the dot and it is preferable that the surface of the optical member is smoothened.

The overcoat layer is not particularly limited and is preferably a resin layer having a refractive index of about 1.4 to 1.8. In a case where the optical member is used as an input medium such as an input sheet on a display surface of an image display device or the like, in order to prevent scattering of image light from the image display device, a difference in refractive index between the overcoat layer and the dot formed of the liquid crystal material is preferably 0.2 or lower and more preferably 0.1 or lower. The refractive index of the dot formed of the liquid crystal material is about 1.6. By using an overcoat layer having a refractive index of about 1.4 to 1.8, the polar angle of light which is actually incident on the dot can be reduced. For example, in a case where the overcoat layer having a refractive index of 1.6 is used and light is incident on the optical member at a polar angle of 45°, a polar angle at which light is reliably incident on the dot can be made to be about 27°. Therefore, by using the overcoat layer, the polar angle of light at which the optical member exhibits retroreflection properties can be widened, and high retroreflection properties can be obtained at a wider angle even in the dot in which an angle between a surface, which is opposite to the substrate, and the substrate is small. In addition, the overcoat layer may function as an anti-reflection layer, a pressure sensitive adhesive layer, an adhesive layer, or a hard coat layer.

Examples of the overcoat layer include a resin layer which is obtained by applying a composition including a monomer to the surface of the substrate that is in contact with the dot, and curing the coating film. The resin is not particularly limited and may be selected in consideration of, for example, adhesiveness with the substrate or the liquid crystal material for forming the dot. For example, a thermoplastic resin, a thermosetting resin, or a ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer may be selected depending on the maximum height of the dot without any particular limitation, and is preferably about 5 μm to 100 μm, more preferably 10 μm to 50 μm, and still more preferably 20 μm to 40 μm. The thickness is the distance from a surface of the substrate, where the dot is formed, to a surface of the overcoat layer provided on a surface of the substrate, where the dot is not formed, which is opposite to the surface where the dot is formed.

<Application of Optical Member>

The application of the optical member according to the present invention is not particularly limited and can be used as various reflection members.

In particular, regarding the optical member where the recognition effective regions are provided in a pattern shape, for example, by forming the pattern as a recognition effective region pattern which is encoded to present position information, the optical member can be used as an input medium which is used in combination with input means such as an electronic pen for converting handwritten information into digital data and inputting the digital data into an information processing device. The optical member is used after preparing the liquid crystal material for forming the dot such that the wavelength of light irradiated from the input means is the same as that where each of the dots exhibits reflecting properties. Specifically, the helical pitch of the cholesteric structure may be adjusted using the above-described method.

The optical member according to the present invention can also be used as an input medium such as an input sheet on a display screen such as a liquid crystal display. At this time, it is preferable that the optical member is transparent. The optical member may be attached to a display screen directly or with another film interposed therebetween so as to be integrated with a display, or may be detachably mounted on a display screen. At this time, it is preferable that the wavelength range of light where the dot in the optical member according to the present invention exhibits selective reflection is different from that of light miffed from a display. That is, it is preferable that the dot has selective reflecting properties in the invisible range and that the display emits invisible light such that a detecting device does not detect light erroneously.

The details of an handwriting input system for converting handwritten information into digital data and inputting the digital data into an information processing device can be found in, for example, JP2014-67398A, JP2014-98943A, JP2008-165385A, paragraphs "0021" to "0032" of JP2008-108236A, or JP2008-077451A.

Examples of a preferable embodiment of the case where the optical member according to the present invention is used as the sheet which is mounted on or in front of a surface of an image-displayable device include an embodiment described in paragraphs "0024" to "0031" of JP4725417B.

Figure 2:
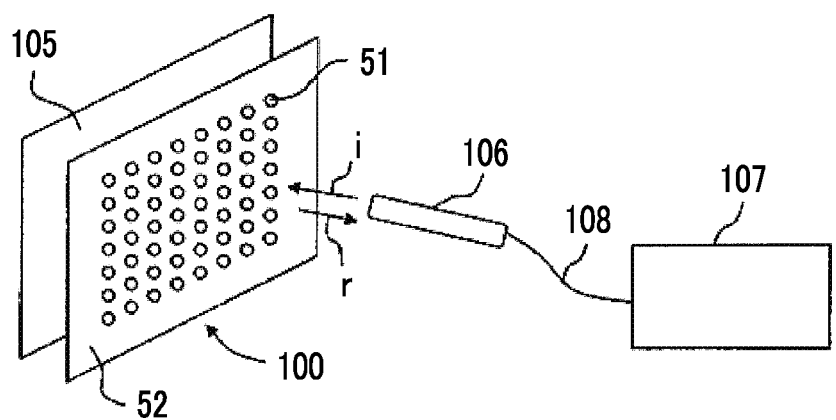
FIG. 2 is a schematic diagram showing a system in which the optical member according to the present invention is used as a sheet which is mounted on or in front of a surface of an image display device (image-displayable device).

FIG. 2 is a schematic diagram showing a system in which the optical member according to the present invention is used as a sheet which is mounted on or in front of a surface of an image-displayable device.

In FIG. 2, a well-known sensor may be used without any particular limitation as long as it emits infrared light i and can detect reflected light r from the above-described pattern, Examples of a pen type input terminal 106 including a read data processing device 107 include a input terminal described in JP2003-256137A including: a pen point that does not include an ink, graphite, or the like; a complementary metal-oxide semiconductor (CMOS) camera that includes an infrared irradiating portion; a processor, a memory; a communication interface such as a wireless transceiver using a Bluetooth (registered trade name) technique; and a battery.

Regarding the operation of the pen type input terminal 106, for example, the pen point is drawn in contact with a front surface of the optical member 100 according to the present invention, the pen type input terminal 106 detects a writing pressure applied to the pen point, and the CMOS camera operates such that a predetermined range around the pen point is irradiated with infrared light at a predetermined wavelength which is emitted from the infrared irradiating portion and such that the pattern is imaged (for example, the pattern is imaged several ten times to several hundred times per second). In a case where the pen type input terminal 106 includes the read data processing device 107, the imaged pattern is analyzed by the processor such that an input trajectory generated by the movement of the pen point during handwriting is converted into numerical values and data to generate input trajectory data, and the input trajectory is transmitted to an information processing device.

Members such as the processor, the memory, the communication interface such as a wireless transceiver using a Bluetooth (registered trade name) technique, or the battery may be provided outside of the pen type input terminal 106 as the read data processing device 107 as shown in FIG. 2. In this case, the pen type input terminal 106 may be connected to the read data processing device 107 through a cord 108, or may transmit read data wirelessly using an electric wave, infrared light, or the like.

In addition, the input terminal 106 may be a reader described in JP2001-243006A.

The read data processing device 107 which can be used in the present invention is not particularly limited as long as it has a function of calculating position information based on continuous image data read from the input terminal 106 and providing the calculated position information together with time information as generate input trajectory data which can be processed in an information processing device. The read data processing device 107 only has to include the members such as the processor, the memory, the communication interface, and the battery.

In addition, the read data processing device 107 may be embedded in the input terminal 106 as described in JP2003-256137A, or may be embedded in an information processing device including a display device. In addition, the read data processing device 107 may transmit the position information to an information processing device including a display device wirelessly, or may be connected thereto through a cord or the like.

In the information processing device connected to a display device 105, an image displayed on the display device 105 is sequentially updated based on trajectory information transmitted from the read data processing device 107 such that a trajectory which is handwritten by the input terminal 106 is displayed on the display device as if it was drawn on paper by a pen.

<Image Display Device>

An image display device according to the present invention includes the optical member according to the present invention.

It is preferable that the optical member according to the present invention is mounted on or in front of an image display surface of the image display device. For example, in the image display device, the optical member according to the present invention may be disposed between an outermost surface or a front surface protective plate of a display device and a display panel. A preferable embodiment of the image display device can be found in the above description regarding the application of the optical member.

The invention described in this specification also includes a system including the image display device in which the optical member according to the present invention is mounted on or in front of an image display surface.

Examples

Hereinafter, the present invention will be described in detail using examples. Materials, reagents, amounts thereof, proportions thereof, operations, and the like shown in the following examples can be appropriately changed as long as they do not depart from the scope of the present invention. Accordingly, the scope of the present invention is not limited to the following examples.

<Preparation of Underlayer>

A composition shown below was stirred and dissolved in a container held at 25° C. to prepare an underlayer-forming solution.

Underlayer-Forming Solution (part(s) by mass)
Propylene glycol monomethyl ether acetate: 67.8
Dipentaerythritol hexaacrylate (trade name: KAYARAD DPHA, manufactured by Nippon. Kayaku Co., Ltd.): 5.0
MEGAFACE RS-90 (manufactured by DIC Corporation): 26.7
IRGACURE 819 (manufactured by BASF SE): 0.5

The underlayer-forming solution prepared as described above was applied to transparent polyethylene terephthalate (PET; COSMOSHINE A4100, manufactured by Toyoho Co., Ltd.) substrate having a thickness of 100 μm using an bar coater in an application amount of 3 mL/m$^2$. Next, the underlayer-forming solution was heated such that the film surface temperature was 90° C., and then was dried for 120 seconds. Next, in a nitrogen purged atmosphere having an oxygen concentration of 100 ppm or lower, 700 mJ/cm$^2$ of ultraviolet light was irradiated using an ultraviolet irradiation device to promote a crosslinking reaction. As a result, an underlayer was prepared.

(Preparation of Cholesteric Liquid Crystal Ink Solution A)

Components shown below were stirred and dissolved in a container held at 25° C. to prepare Cholesteric liquid crystal ink solution A (liquid crystal composition).

Cholesteric Liquid Crystal Ink Solution A (part(s) by mass)
Liquid crystal compound A: 100
A chiral agent having the following structure: 3.3
Photopolymerization initiator (LUCIRIN (registered trade name) TPO, manufactured by BASF Japan): 4
Methyl isobutyl ketone: appropriate amount Liquid Crystal Compound A

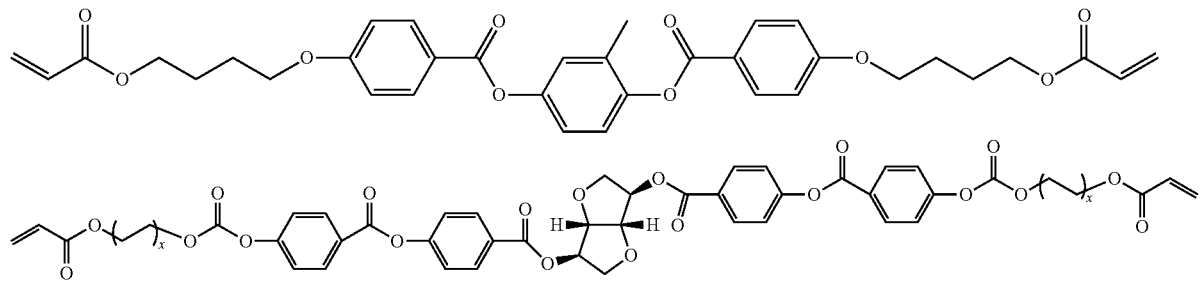

[X represents 2 to 5 (integer).]

(Preparation of Cholesteric Liquid Crystal Ink Solution B)
Components shown below were stirred and dissolved in a container held at 25° C. to prepare Cholesteric liquid crystal ink solution B (liquid crystal composition).
Cholesteric Liquid Crystal Ink Solution B (part(s) by mass)
Methoxyethyl acrylate: 145.0

A mixture of rod-shaped liquid crystal compounds having the following structures: 100.0
IRGACURE 819 (manufactured by BASF SE): 10.0
A chiral agent having the following structure: 3.8
A surfactant having the following structure: 0.08
Rod-Shaped Liquid Crystal Compound

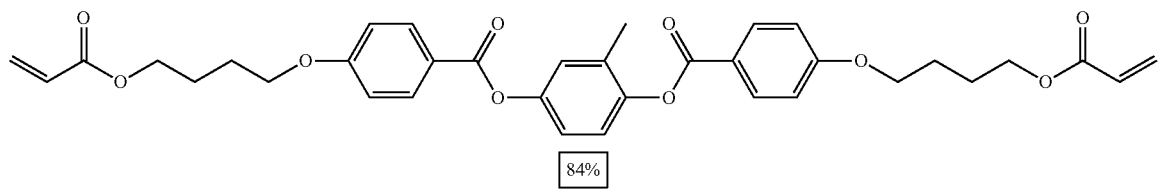

84%

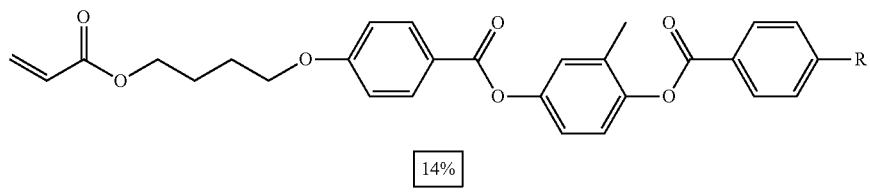

14%

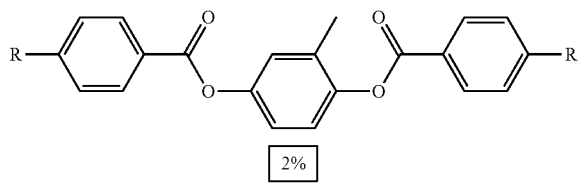

2%

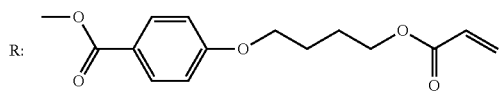

R:

Numerical values are represented by mass %. In addition, a group represented by R is a partial structure present on the left and right sides, and this partial structure is bonded to an oxygen atom portion.

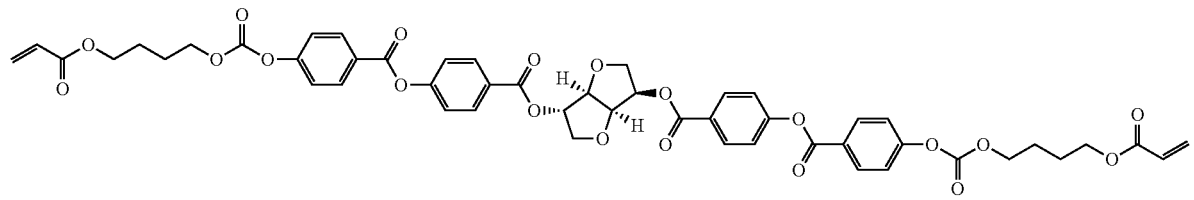

Chiral Agent

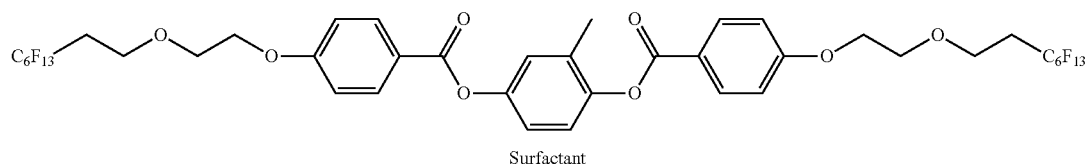

Surfactant

<Formation of Dot>

Cholesteric liquid crystal ink solution A or B prepared as described above was jetted to the underlayer of the substrate prepared as described above, which was the laminate including the PET support and Underlayer, using an ink jet printer (DMP-2831, manufactured by Fujifilm Dimatix Inc.) such that the radius of the recognition effective region, the distance between dots, the number of dots, and the radius of each of the dots were as shown in Table 1. At this time, Cholesteric liquid crystal ink solution A or B was jetted to the entire surface of an 50×50 mm region such that the average distance between recognition effective regions was 300 μm. Next, Cholesteric liquid crystal ink solution A or B was dried at 95° C. for 30 seconds. Next, 500 mJ/cm$^2$ of ultraviolet light was irradiated using an ultraviolet irradiation device to promote a crosslinking reaction. As a result, dots were formed on the surface of the underlayer, <Formation of Overcoat Layer>

A composition shown below was stirred and dissolved in a container held at 25° C. to prepare an overcoat layer-forming coating solution.
Overcoat Layer-Forming Coating Solution (part(s) by mass)
  Acetone: 100.0
  KAYARAD DPCA-30 (manufactured by Nippon Kayaku Co., Ltd.): 100.0
  IRGACURE 819 (manufactured by BASF SE): 3.0

The overcoat layer-forming coating solution prepared as described above was applied to the underlayer, where the cholesteric liquid crystal dot was formed, using a bar coater in an application amount of 40 mL/m$^2$. Next, the overcoat layer-forming coating solution was heated such that the film surface temperature was 50° C., and then was dried for 60 seconds. Next, 500 mJ/cm$^2$ of ultraviolet light was irradiated using an ultraviolet irradiation device to promote a crosslinking reaction. As a result, an overcoat layer was formed, and an optical member was prepared.

<Evaluation of Optical Member Performance>

Each of the prepared optical members was evaluated based on the following criteria. The results are shown in Table 1.

(Retroreflection Intensity at Polar Angle of 45°)

In addition, using an visible and near-infrared light source (HL-2000, manufactured by Ocean Optics Inc.), a ultra high-resolution multi-channel fiber spectrophotometer (HR4000), and a 2-branched optical fiber, the retroreflection intensity of each of the optical members at a polar angle of 45° was evaluated under conditions of aperture diameter: 1 mm and sheet normal line: 0°. The evaluation standards are as follows.

A: the retroreflection intensity was 4.0% or higher

B: the retroreflection intensity was lower than 4.0% and 3.0% or higher

C: the retroreflection intensity was lower than 3.0% and 2.0% or higher

D: the retroreflection intensity was lower than 2.0% and 1.0% or higher (A to D are in a practical level)

E: the retroreflection intensity was lower than 1.0% and 0.5% or higher

F: the retroreflection intensity was lower than 0.5%

(Visibility)

Each of the optical members was adhered to a 24-inch liquid crystal display device, which was separately prepared, to prepare a liquid crystal display device for visibility evaluation. The liquid crystal display device was turned on and is displayed white, the distance between the eyes and the liquid crystal display device was fixed to 30 cm, and 5 cm×5 cm surface regions of the screen were sequentially observed in a direction from the upper left to the lower right. Among 40 divided surface observation regions, the number of regions where the dots were able to be recognized was counted. The evaluation standards are as follows.

A: the number of recognized regions was 0

B: the number of recognized regions was 2 or less

C: the number of recognized regions was 4 or less

D: the number of recognized regions was 6 or less (A to D are in a practical level)

E: the number of recognized regions was 10 or less

F: the number of recognized regions was 11 or more

TABLE 1

| | Cholesteric Liquid Crystal Ink Solution | Recognition Effective Region (Radius) | Distance Between Dots | Number of Dots | Diameter of Each of Dots | Retroreflection Intensity at Polar Angle of 45° | Visibility |
|---|---|---|---|---|---|---|---|
| Example 1 | A | 160 | 8 | 9 | 70 | D | D |
| Example 2 | A | 149 | 7 | 16 | 47 | C | C |
| Example 3 | A | 135 | 6 | 16 | 43 | C | B |
| Example 4 | A | 136 | 6 | 25 | 34 | B | A |
| Example 5 | A | 117 | 9 | 9 | 49 | D | C |
| Example 6 | A | 111 | 9 | 9 | 46 | C | C |
| Example 7 | A | 100 | 7 | 9 | 42 | B | B |
| Example 8 | A | 45 | 6 | 4 | 29 | C | A |
| Example 9 | A | 75 | 9 | 4 | 48 | B | A |
| Example 10 | A | 75 | 9 | 9 | 29 | A | A |
| Example 11 | B | 75 | 9 | 9 | 29 | A | A |
| Example 12 | B | 112 | 8 | 16 | 33 | A | B |
| Example 13 | B | 50 | 6 | 4 | 32 | B | A |
| Comparative Example 1 | A | 100 | — | 1 | 100 | D | F |
| Comparative Example 2 | A | 100 | 15 | 9 | 37 | E | B |
| Comparative Example 3 | A | 49 | 6 | 3 | 42 | F | A |

The dot maximum heights of all the optical members according to Examples 1 to 11 were 3 μm or less when observed with a laser microscope (manufactured by Keyence Corporation).

In this case, the dot maximum height refers to the highest value among measured values which were obtained by selecting 10 arbitrary recognition effective regions on the optical member and measuring the heights of all the dots included in the recognition effective regions.

EXPLANATION OF REFERENCES

1: dot
2: substrate
3: support
4: underlayer
5: overcoat layer
11: recognition effective region
100: optical member
105: display device
106: pen type input terminal
107: read data processing device
108: cord

What is claimed is:

1. An optical member comprising:
a substrate; and
a dot that is in contact with a surface of the substrate,
wherein the dot is formed of a liquid crystal material having a cholesteric structure,
four or more dots form one recognition effective region as an aggregate, and
a shortest inter-end distance between one arbitrary dot and at least two other dots in the recognition effective region is 10 μm or less,
wherein a plurality of recognition effective regions are provided in a pattern shape on the surface of the substrate, and
wherein a ratio of a dot diameter to a distance between the plurality of recognition effective regions is 1:5 to 1:50.

2. The optical member according to claim 1,
wherein each of the dots has a diameter of 20 to 50 μm.
3. The optical member according to claim 1,
wherein each of the dots has a diameter of 20 to 45 μm.
4. The optical member according to claim 1,
wherein each of the dots has a diameter of 20 to 40 μm.
5. The optical member according to claim 1,
wherein when the recognition effective region is formed of a smallest circle including the four or more dots, a radius of the circle is 125 μm.
6. The optical member according to claim 1,
wherein the liquid crystal material includes a surfactant.
7. The optical member according to claim 6,
wherein the surfactant is a fluorine surfactant.
8. The optical member according to claim 1,
wherein a value obtained by dividing a maximum height of each of the dots by the diameter of the dot is 0.13 to 0.30.
9. The optical member according to claim 1,
wherein in an end portion of each of the dots, an angle between the surface of the dot and the substrate is 27° to 62°.
10. The optical member according to claim 1,
wherein the liquid crystal material is a material obtained by curing a liquid crystal composition including a liquid crystal compound and a chiral agent.
11. The optical member according to claim 1,
wherein each of the dots has wavelength selective reflecting properties in which a center wavelength is present in an infrared range.
12. The optical member according to claim 11,
wherein each of the dots has wavelength selective reflecting properties in which a center wavelength is present at a wavelength of 800 to 950 nm.
13. The optical member according to claim 1 which is transparent.
14. An image display device comprising the optical member according to claim 13.

* * * * *